Figure 1:
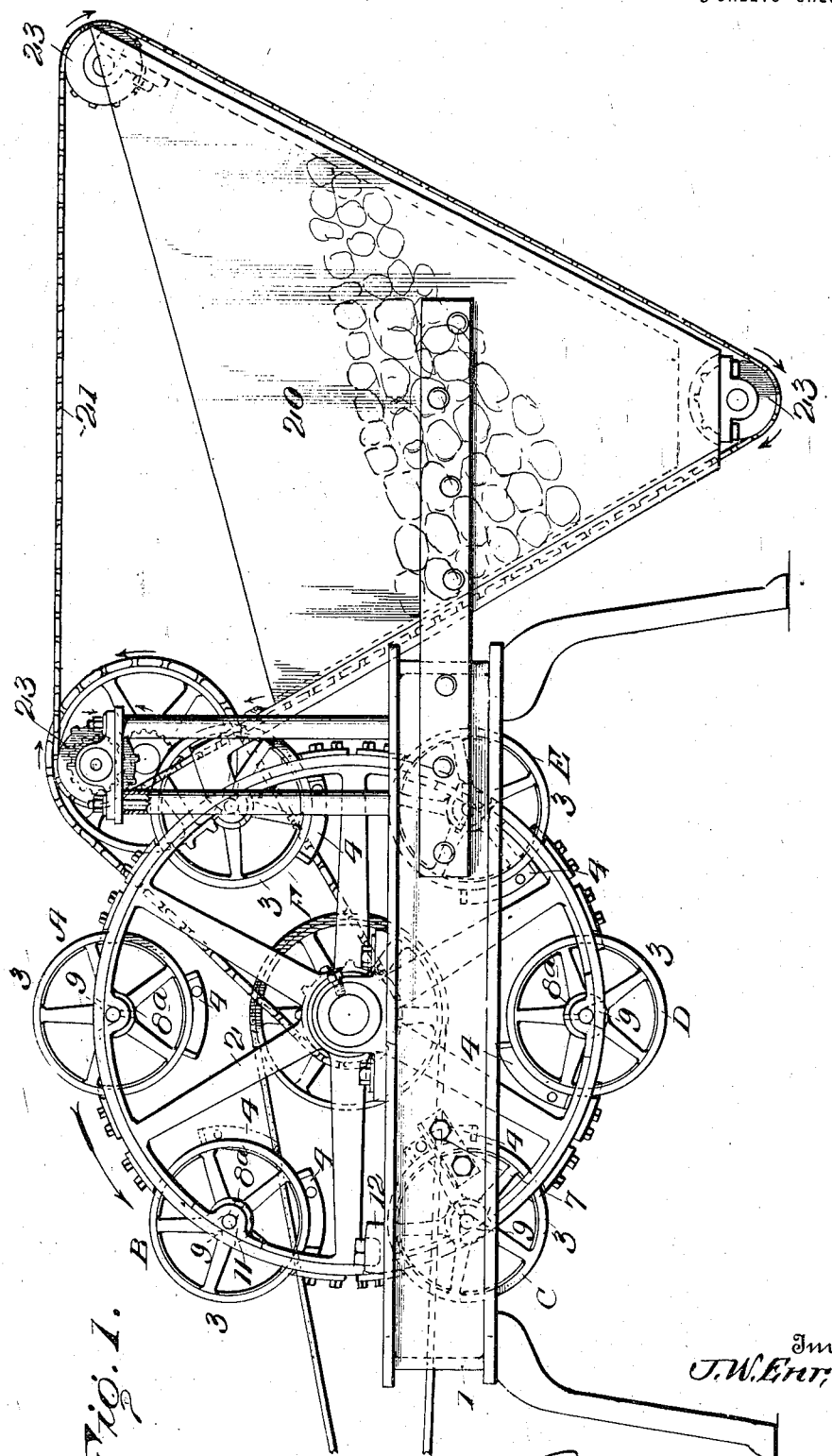

J. W. ENRIGHT.
NUT CRACKING MACHINE.
APPLICATION FILED DEC. 29, 1916.

1,279,309.

Patented Sept. 17, 1918.
3 SHEETS—SHEET 1.

Inventor
J. W. Enright.

By
Attorneys

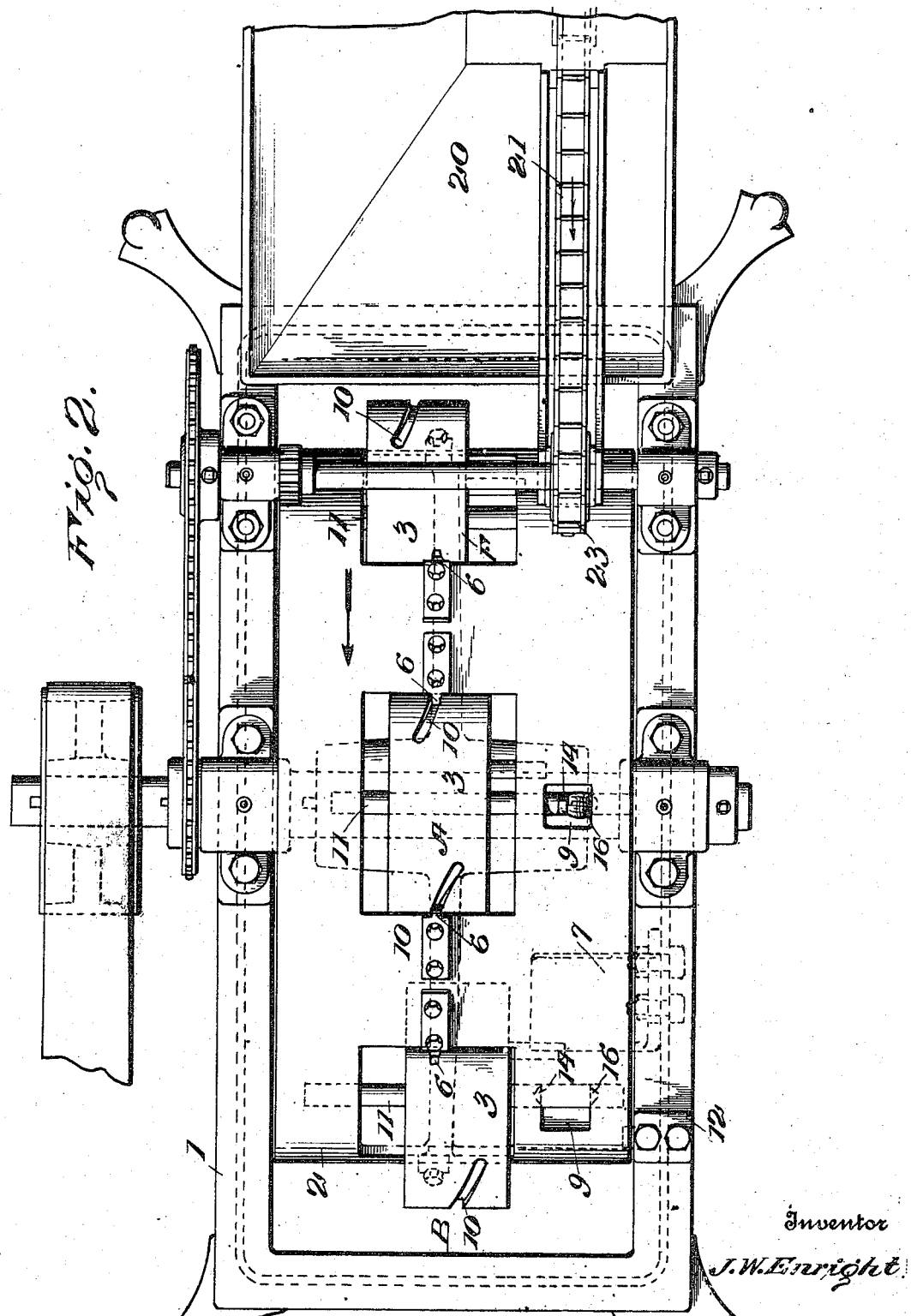

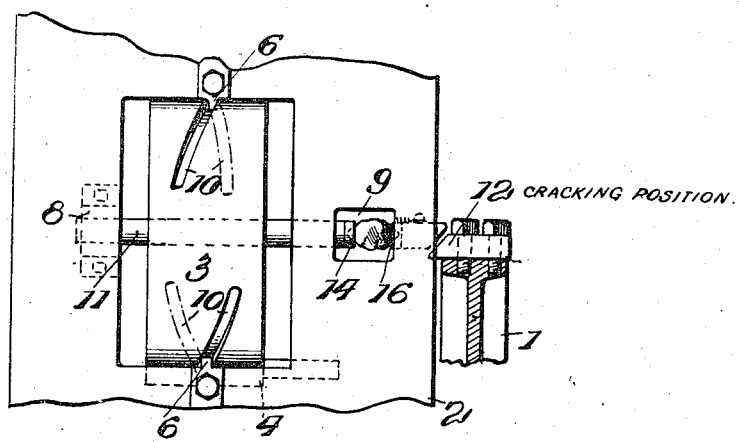
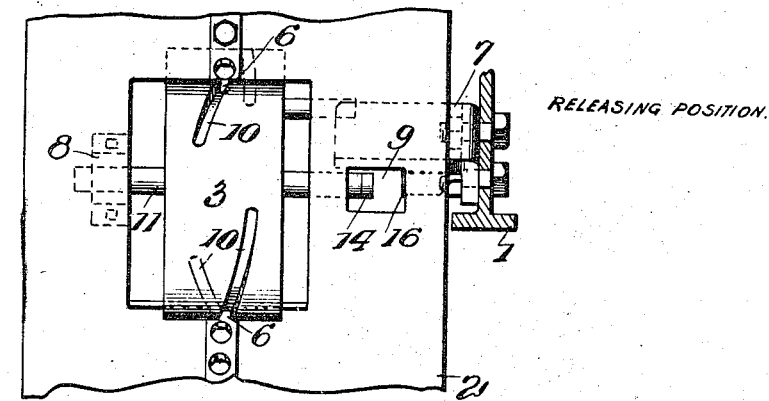
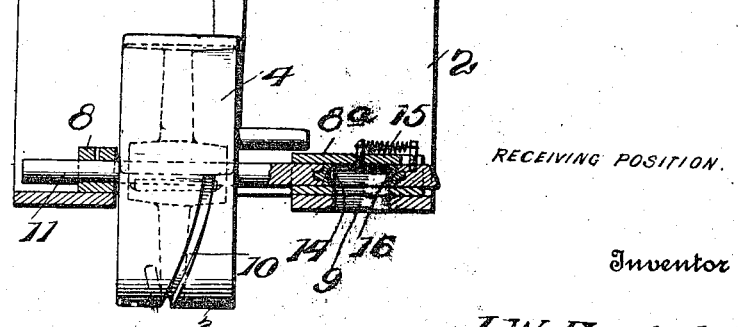

UNITED STATES PATENT OFFICE.

JOHN W. ENRIGHT, OF NEW ORLEANS, LOUISIANA.

NUT-CRACKING MACHINE.

1,279,309.  Specification of Letters Patent.  Patented Sept. 17, 1918.

Application filed December 29, 1916. Serial No. 139,641.

*To all whom it may concern:*

Be it known that I, JOHN W. ENRIGHT, of New Orleans, in the parish of Orleans and State of Louisiana, have invented certain new and useful Improvements in Nut-Cracking Machines; and I do hereby declare the following to be a full, clear, and exact description of the invention, such as will enable others skilled in the art to which it appertains to make and use the same.

The primary object of my invention is to provide an improved nut cracking machine capable of handling nuts of various sizes without requiring previous grading or sorting.

A further object is to insure a uniform cracking stroke regardless of the variations in the lengths of the nuts.

A further object is to provide improved means for clamping the individual nuts as they are received from a conveyer and conducting them into contact with the fracturing element.

As illustrated in the accompanying drawing, Figure 1 is a side elevation of a machine embodying my invention. Fig 2 is a plan view, and Figs. 3, 4 and 5 are details showing various positions of parts.

As illustrated, the frame 1 supports a main carrier 2 shown in the form of a wheel suitably mounted upon a shaft extending transversely of the frame and adapted to be rotated to cause the main carrier to rotate in the direction of the dart in Fig. 1. Mounted upon the main carrier is a series of automatic nut adjusting and clamping elements 3. These are shown in the form of wheels individually mounted and capable of rotation upon the main carrier independently of the movement of the latter. These elements are adapted to clamp the nuts and convey them into contact with the cracking element.

As all of the parts 3 are of corresponding formation a detailed description of one will suffice. My object is to cause these elements 3 to oscillate, that is to impart to them a substantially pendulum movement, the turn in one direction effecting the clamping of the nut while the bodily advance of the element 3 and the nut conducts the nut into contact with the cracking device, after which the rotation of the wheel in the reverse direction releases the nut. I have shown the parts 3 provided with weights 4 on their peripheries so that the normal position of the wheel, due to gravity, will be substantially that of the wheels A and F, Fig. 1, and as wheel B is shown in full lines. The wheel is keyed upon a shaft 11 mounted in bearings 8—8ª in the main carrier 2. The end of this shaft projecting into the bearings 8ª constitutes a jaw 14. A coacting jaw 16 is mounted in the bearing 8ª and is movable against the tension of a spring 15. The nuts are fed into the pockets 9 on the carrier 2, one of these pockets being arranged adjacent each of the clamping elements with a portion of the bearing 8ª forming a part of the pocket.

I have shown the wheel formed in its periphery with two oppositely disposed spiral slots 10. These are adapted to be engaged by pins 6 mounted upon the rim of the main carrier. As the wheel turns on its axle to maintain the positions of A, B and F, consequent upon the rotation of the carrier, the engagement of the pins with the slots shifts the wheel and the axle 11 to which it is keyed laterally so as to bring jaws 14 and 16 together to clamp the nut. The nut at this time acts to frictionally retard the wheel from turning on its axle and causes the wheel to take approximately the position indicated by the dotted lines of wheel B, this position varying according to the length of the nut. As the wheel advances the projecting surface on the outer end of the jaw 16 contacts with a fracturing element 12 mounted upon the frame 1. This effects a positive closing of the jaw 16 and likewise a uniform stroke thereof sufficient to crack the nut. In the further advance of the wheel into substantially the position of wheel C of Fig. 1 a pin 5 carried by the weight 4 of the wheel contacts with a stop 7 mounted on the frame 1. As the main carrier advances this stop causes the wheel to rotate over the center, and the engagement of the pins 6 with slots 10 effects the reverse shifting of the wheel and the shaft 11, causing the jaws to open and release the cracked nut, the successive stages of movement of the wheel being indicated by D and E.

Wheel F is in the position in which the pocket in the main carrier 2 receives a nut from a hopper 20. The nut feeding mechanism employed in this hopper forms no part of the present invention. It consists, however, of a chain conveyer 21 movable over sprockets 23 and adapted to deliver the nut to each of the pockets 9 in the main carrier 2 successively as the respective pockets come into contact with the outlet from the hopper.

I claim as my invention:

1. In a nut cracking machine, a main carrier, a plurality of nut receptacles movable individually on, and carried by, said carrier, and means carried by said carrier for shifting said receptacles by the advance of said carrier, such shifting movement effecting the clamping of the nuts, and means for cracking and releasing the nuts.

2. In a nut cracking machine, a carrier comprising a wheel, a plurality of nut receptacles comprising wheels freely rotatable upon, and bodily movable with, said carrier, each of said wheels being weighted to cause it to rotate relative to said carrier, and means for producing a shifting movement of said wheels to successively effect the clamping, cracking and releasing of the nuts.

3. In a nut cracking machine, a main rotary carrier, a plurality of wheels journaled in said carrier and constituting nut receptacles, said wheels being each mounted to oscillate on said carrier and adapted to successively receive nuts; means for effecting the oscillation of said wheels, means for clamping the nut rendered effective by the movement of the wheel in one direction, means for cracking the nut, and means for releasing the cracked nut rendered effective by the movement of the wheel in the reverse direction.

4. In a nut cracking machine, a main carrier, a rotary element mounted on said carrier, having means for effecting its rotation relative to said carrier, a shaft journaled in said carrier on which said element is keyed, the extremity of said shaft forming a jaw, a second co-acting jaw, the space intermediate said jaws being adapted to receive a nut, means for shifting said element laterally to clamp the nut between said jaws as said element is rotating relative to its carrier, and means for further closing said jaws to crack the nut.

5. In a nut cracking machine, a main carrier, a rotary element mounted on said carrier, a shaft journaled in said carrier on which said element is keyed, the extremity of said shaft forming a jaw, a second co-acting jaw, the space intermediate said jaws being adapted to receive a nut, said element having a spiral slot in its surface, and a pin on said main carrier adapted to enter said slot to shift said element laterally to clamp the nut between said jaws, and means for further closing said jaws to crack the nut.

6. In a nut cracking machine, a main carrier, a wheel mounted to rotate on said carrier and having means for effecting its relative rotation, a shaft journaled in said carrier on which said wheel is keyed, the extremity of said shaft forming a jaw, a second co-acting jaw, means for shifting said wheel laterally to bring the jaws together as the wheel is rotating relative to its carrier, and a fixed stop with which one of said jaws contacts in the advance of the main carrier.

7. In a nut cracking machine, a frame having a stop, a carrier comprising a wheel, a plurality of nut receptacles comprising wheels rotatably mounted upon, and bodily movable with, said carrier, and means movable with said carrier for oscillating said receptacles to successively clamp the nuts, said means including pins on said wheels adapted to contact with said stop.

8. In a nut cracking machine, a carrier, a nut receptacle comprising a wheel mounted to rotate on said carrier, said wheel having a pair of oppositely disposed spiral slots and said carrier having a pin adapted to successively travel in said slots to effect the lateral shift of said wheel.

In testimony whereof, I have signed this specification in the presence of two subscribing witnesses.

JOHN W. ENRIGHT.

Witnesses:
 SAMUEL MANFIE,
 FRANK KLEINSCHMIDT.